Oct. 29, 1929.  J. M. HALL  1,733,223
SHOCK ABSORBER
Filed Feb. 26, 1927   3 Sheets-Sheet 1
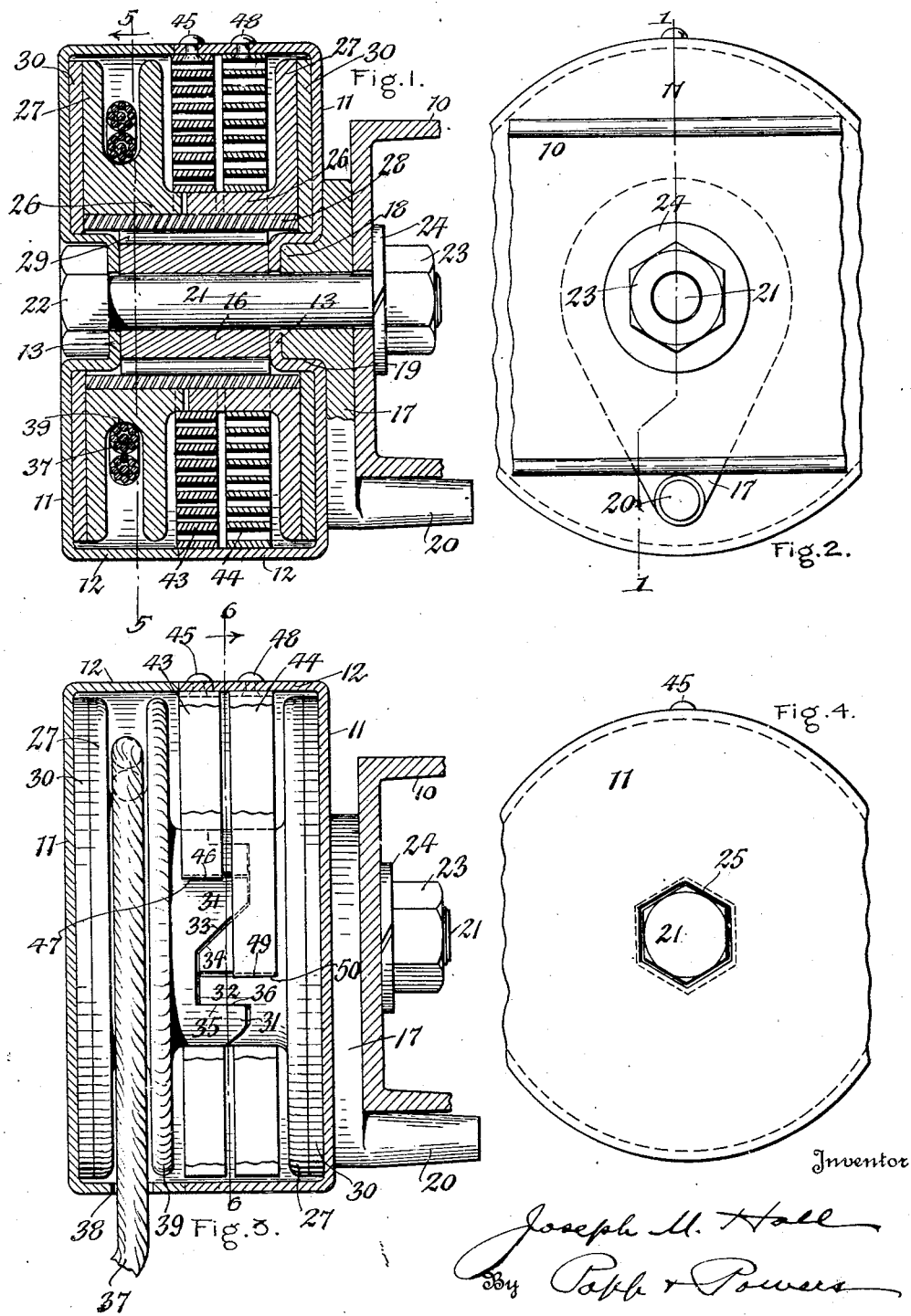

Oct. 29, 1929.  J. M. HALL  1,733,223
SHOCK ABSORBER
Filed Feb. 26, 1927   3 Sheets-Sheet 2

Inventor
Joseph M. Hall
By Popp & Powers
Attorneys

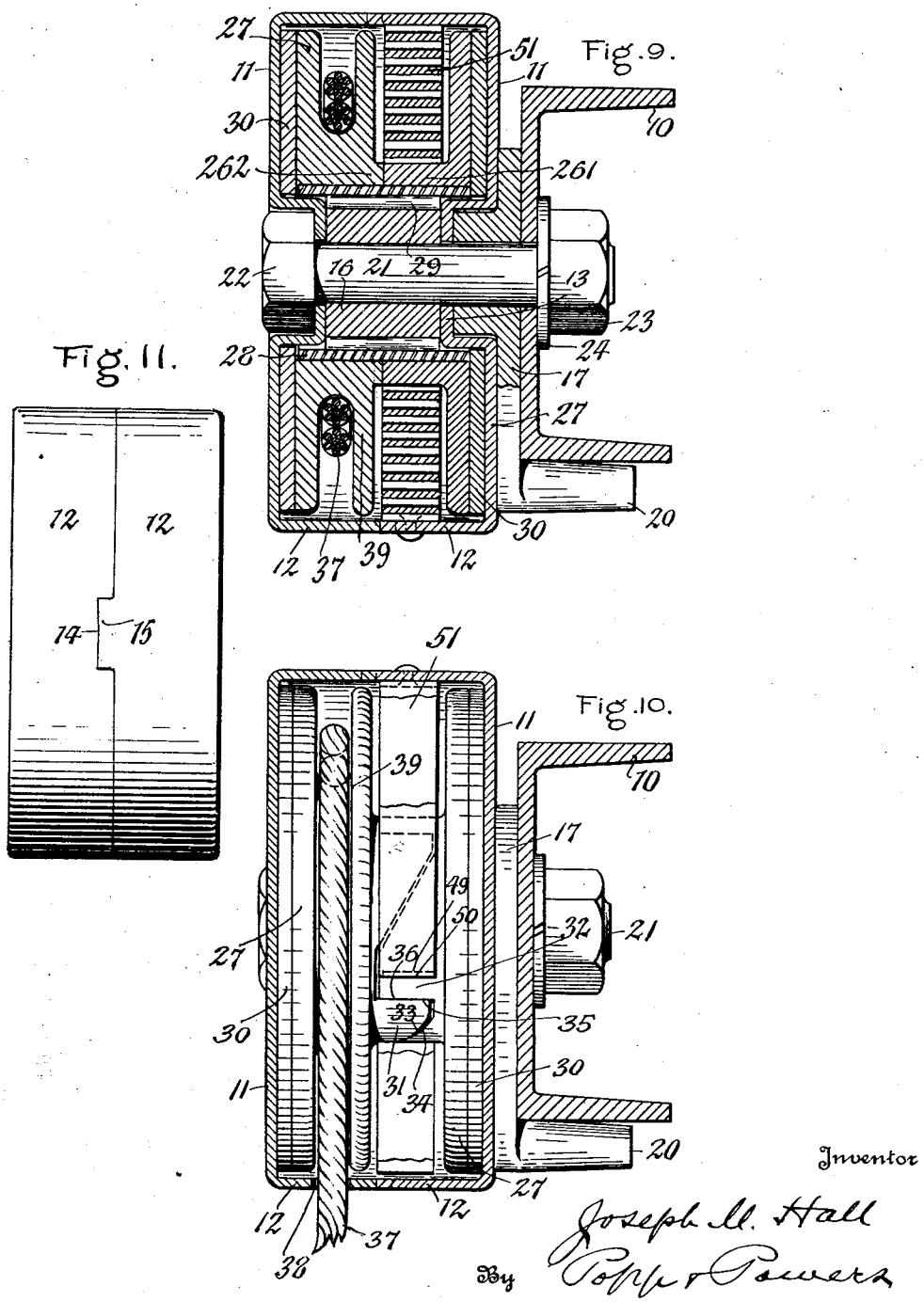

Patented Oct. 29, 1929

1,733,223

UNITED STATES PATENT OFFICE

JOSEPH M. HALL, OF HAMILTON, ONTARIO, CANADA

SHOCK ABSORBER

Application filed February 26, 1927. Serial No. 171,152.

This invention relates more particularly to that class of shock absorbers which are primarily intended for use on automobiles in order to cushion the rebound which occurs between the axle and body or other relatively movable parts of the automobile and thereby prevent breaking or straining of the springs which is liable to occur when the same have been deflected an undue extent prior to the rebound.

It is the purpose of this invention to provide a shock absorber of this character in which the rebound is absorbed by parts which engage frictionally with each other and in which spring means are employed for restoring the parts to their normal position after the rebound has been absorbed.

A further object of this invention is to provide means for accomplishing this purpose which are efficient in operation, not liable to get out of order and capable of being produced without requiring accuracy or precision in workmanship, and thereby permit of manufacturing and marketing this device at comparatively low cost.

Figure 1 is a vertical transverse section of one form of shock absorber embodying my invention showing the same mounted on an automobile frame, the section being taken on line 1—1 Fig. 2.

Figure 2 is a side elevation of the same partly broken away.

Figure 3 is an elevation of the shock absorber and its mounting with the front part of the housing removed and shown in section.

Figure 4 is a side elevation of the outer section of the housing, partly broken away.

Figure 9 is a vertical section corresponding to Fig. 1 showing a modified form of my invention.

Figure 10 is a view similar to Fig. 3 of the modified construction shown in Fig. 9.

Figure 11 is a top plan view of the housing or stator showing the manner in which the two sections of the same are interlocked against relative circumferential motion.

Similar characters of reference indicate like parts in the several figures of the drawings.

Figure 5:
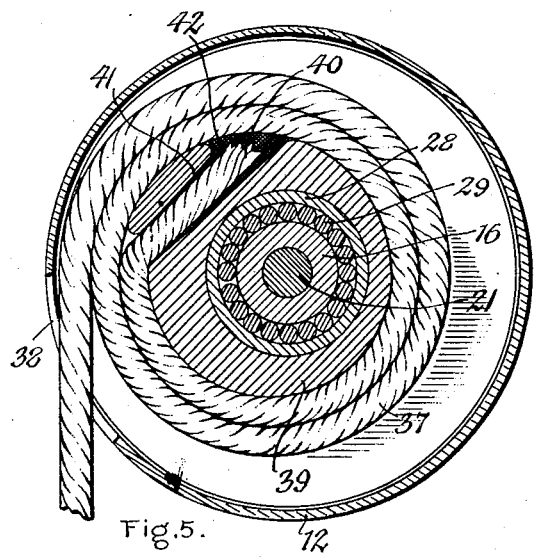
Figure 5 is a vertical section taken on line 5—5 Fig. 1, showing the drum in normal position.
Figure 7:
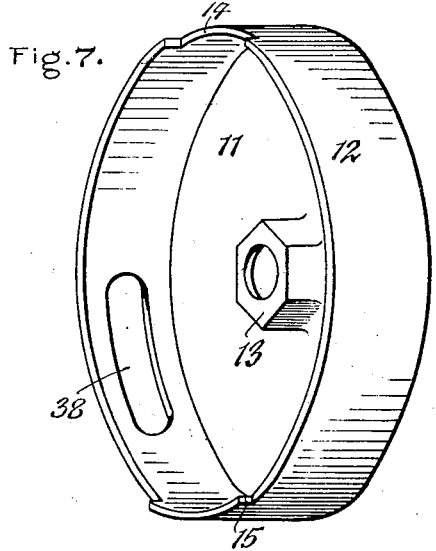
Figures 7 and 8 are perspective views of the two sections of the housing forming part of the stator of the shock absorber.

In its general organization this shock absorber consists of a stator or non-rotary member, a rotor which is adapted to turn with reference to the stator, said stator and rotor being adapted to be mounted on two relatively movable parts of an automobile or the like, means for turning the rotor forwardly during a rebound action of the spring which connects the relatively movable members of the car, means for creating lateral friction engagement between said stator and rotor while the rotor turns forwardly during the rebounding action, and spring means for turning the rotor backwardly after such rebound action.

Although this shock absorber may be mounted on any suitable part of an automobile the stator in the present case is organized for mounting the same on one of the side frames 10 of the chassis of the car and the rotor is adapted to be connected with one of the axles which is movable vertically relatively with reference to this frame.

In the preferred construction of the shock absorber shown in Figs. 1 to 8, the stator is constructed in the form of a housing or enclosing casing which is composed mainly of two light hollow or cup-shaped parts or sections. Each of these sections consists of an outer disk or head 11 and an inwardly projecting cylindrical flange or rim 12, and a central inwardly dished hub 13 which is constructed from a single sheet of metal which may be stamped in any well-known and approved manner.

These two housing sections are assembled with the inner edges of their flanges 12 arranged edge to edge so that together they form a complete housing and these sections are interlocked with each other so as to maintain them against circumferential motion by providing each of these flanges on its diametrically opposite sides with a locking notch 14 and a locking lug 15 so that upon engaging the locking lug 15 of one of these housing sections with the locking notch 14 of the other section, as shown in Fig. 11, these housing sections will be reliably held against turning one relatively to the other.

Between the inner ends of the hubs 13 of the two housing sections is arranged a spacing sleeve 16 which also forms part of the bearing for the rotor on the stator or housing. Between the inner housing section and the main frame 10 of the automobile is arranged a bracket 17 which forms part of the means for mounting a shock absorber on the frame of the car. This bracket is provided at its inner end with a non-circular collar or boss 18 preferably hexagonal, which engages with a hexagonal or non-circular socket 19 which is formed in the outer side of the inwardly disked housing section which is arranged next to the frame 10.

At its outer end this bracket is provided with a laterally projecting lug 20 which engages with the underside of the frame 10, as shown in Figs. 1, 2, and 3, or other stationary part of the frame. The housing bracket and frame are connected with each other by means of a bolt, the shank or body 21 of which passes through the spacing sleeve 16, and the bottom of the hubs of the housing section engaging with opposite sides of this sleeve, also through the brackets 17 and the adjacent part of the main frame 10 while the head 22 of the bolt bears against the bottom of the socket which is formed on the outer side of the inwardly dished central hub of the outer housing section, and the nut 23 of this bolt bears through the medium of a washer 24 against the inner side of the frame 10. The head 22 of the bolt is of hexagonal or noncircular form on its periphery and engages with the bore of the socket 25 formed in the hub of the outer housing section, as shown in Fig. 4. By this means the bracket 19 is held against turning and the two sections of the housing are held against turning on the bracket and the bolt is prevented from turning on the housing so that as a whole the housing, forming the stator of the shock absorber, is positively held against rotary motion on the main frame of an automobile.

Figure 6:
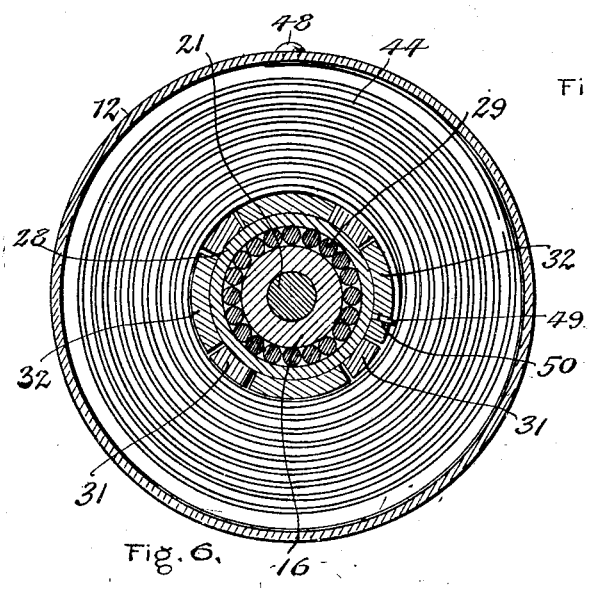
Figure 6 is a vertical section taken on line 6—6 Fig. 3.
Figure 8:
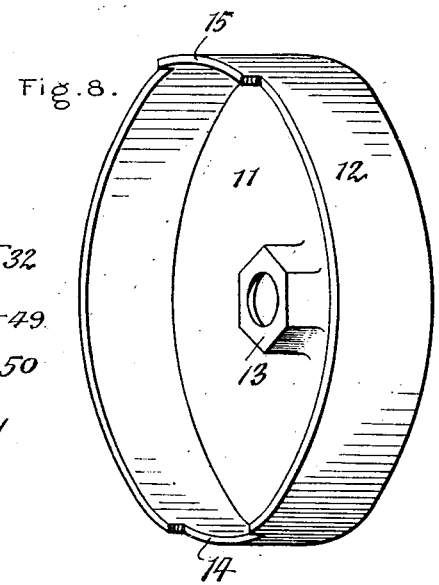

The rotor of the shock absorber comprises two rotary sections which are journaled upon the hub portion or axle at the center of the stator, each of these sections having a tubular hub 26, the inner ends of which oppose each other and the outer ends of which are provided with friction disks 27 which face the walls or disks 11 of the housing. These two rotor sections are journaled upon the axle or hub portion of the housing by a bearing of any suitable construction, but preferably by means of a bearing consisting partly of the spacing sleeve 16 which forms an inner raceway, an outer bearing sleeve 28 upon which the hubs 26 of the rotor sections are mounted, and an annular row of bearing rollers 29 interposed between the inner and outer bearing sleeves 16 and 28 as shown in Figs. 1, 5 and 6. Instead of engaging the friction disks 27 of the rotor directly with the walls or disks of the housing, stationary friction disks 30 of fiber or other suitable material are arranged on the inner sides of these walls and secured thereto by cement or any other suitable means so as to in effect become a part of the stator.

Means are provided whereby upon turning one of the rotor sections in a forward direction during rebound of the spring supports of the car, such rotary motion will be transmitted to the other stator section while at the same time these sections will be forced apart laterally or in a direction parallel with the axes of the rotor and stator, so as to press the friction disks 27 of the rotor against the friction disks 30 of the stator and thereby produce a frictional resistance between these members which operates to absorb the shock during rebound of the spring system of the car. The preferred means for thus producing lateral pressure of the rotor sections against the walls of the stator consists of wedge means interposed between the hubs of the rotor sections, these wedge means comprising a plurality of lugs 31 arranged on the hub of the outer rotor section and projecting into the spaces between corresponding lugs 32 on the hub of the other rotor section, as shown in Fig. 3, the front or advancing sides 33 of the lugs on one of these rotor sections being inclined and engaging with corresponding inclines 34 on the rear or trailing sides of the lugs 32 on the other rotor section. By this means a forward turning movement of the outer rotor section will produce not only a forward movement of the inner rotor section, but the wedge action due to cooperation of the inclined surfaces 33, 34 will produce a spreading action of the rotor section and an engagement of their disks 27 with the friction disks 30 in the inner walls of the stator housing. During the return or backward movement of the rotor sections the wedging engagement between the same is released and the same are caused to move backwardly in unison by springs 43 and 44 or by engagement of abrupt shoulders 35 on the rear sides of the lugs 31 with abrupt shoulders 36 on the front sides of the lugs 32, as shown in Fig. 3.

In the preferred construction the forward motion of the rotor is produced by means of a flexible line 37 having preferably the form of a cable which passes through an opening 38 in the outer housing section and is adapted to be secured at its outer end by any suitable means with the axle of the car, while its inner end is wound upon the periphery of a drum 39 arranged on the outer section of the rotor. The connection between the inner end of this line 37 and the drum may be effected in various ways for enabling the arrangement of the extreme inner end 40 of this pull line or cable in an opening 41 in the bottom of the groove of the drum and securing this end 40 within the opening by a plug 42 of lead or other suitable material.

The drum 39 is preferably so constructed that its periphery or bearing surface which is engaged by the pull line is of eccentric or cam shape, as shown in Fig. 5 and when this absorber is installed in its operative position on the car, the drum presents its shortest radius to the line of pull of the cable 37 while the axle and frame of the body are separated to their maximum extent, but the drum presents its longest radius to the line of pull while the axle and frame members of the car are separated the normal extent. Due to this construction in normal position the pull of the cable 37 on the drum will be effected with comparative ease owing to the greater leverage encountering less resistance from the absorber, but as the drum turns in either direction and presents its gradually deceasing length of radius to the pulling line, the power due to the pulling effect on the cable is gradually increased in proportion to the increase or decrease in separation of the axle from the body, thereby producing the maximum resistance to the separation of the car and axle under rebound while these members are separated their full extent, the least resistance while these members are in normal position and greater resistance while these members are nearest to each other.

The return or backward rotary motion of the rotor sections is preferably effected by spring means, which in the construction shown in Figs. 1–3 and 6, preferably consists of two volute springs 43 and 44 which are arranged side by side, the outer spring 43 having its outer end connected by means of a rivet 45 or otherwise with the flange or rim of the inner casing section while its inner end is connected by means of a hook 46 thereon engaging with a groove 47 on the hub of the outer rotor section, and the outer end of the inner spring 44 is connected by means of a rivet 48 or otherwise with the rim of the inner housing section while its inner end is provided with a hook 49 engaging with a groove 50 in the hub of the inner rotor secton, as shown in Figs. 3 and 6.

Although advantageous results are obtained by making the return springs 43, 44 of the same capacity it is preferable to make the outer spring 43 somewhat heavier or of greater spring capacity than the inner spring 44, as shown in Fig. 1. These springs tend constantly to resist the forward rotary movement of the two rotor sections and when the load is removed from these springs the same actuate to return these rotor sections to their normal position, but the pull of the heavy outer spring 43 being somewhat greater than the pull of the inner light spring 44 causes the outer rotor section to turn backwardly and wind the cable 37 thereon, while the inner spring 44 turns the inner rotor section backwardly and thus avoids imposing the work of returning the inner rotor section upon the outer heavy spring 43.

In the operation of this device an outward pull upon the cable 37 which is produced during a separation of the axle and body of the car, will cause this cable to unwind from the drum 39 and turn the two rotor sections forwardly, which movement is yieldingly resisted not only by the frictional engagement of the disks 27 of the rotor with the disks 30 of the stator but also by the two return springs 43 and 44, which frictional resistance is produced by the wedge action of the cooperating inclines 33, 34 on the opposing hubs of the rotor sections, as previously explained.

When the outward pull on the line 37 is released, which occurs when the axle and frame of the car approach each other while dropping in a hole or striking an obstruction, then the springs 43, 44 operate to turn the rotor sections backwardly in order to take up the slack in the pull line and wind the same on the drum 39. But, during such backward rotation of the rotor sections the abrupt faces 35, 36 on the hubs of the rotor sections may engage with each other while their cooperating inclined faces are disengaged from each other, thereby eliminating the wedge action between the same and discontinuing the pressure of the rotor sections against the housing walls so that a much reduced resistance is offered to the backward rotation of the rotor sections, and thus permits the same to promptly wind up the slack portion of the pull line 37 on the drum 39.

Instead of employing two volute springs in a shock absorber, one for pulling backwardly the outer section of the rotor and the other for pulling back the inner section of the rotor, the return action of both of these rotor sections may be effected by the employment of one volute spring 51, as shown in the construction illustrated in Figs. 9 and 10. When only one return spring is used, the same has its opposite ends connected respectively with the housing and hub 261 of the inner rotor section in substantially the same manner in which the spring 44 is connected with the inner rotor section in Figs. 1 and 2, and no spring is employed which acts directly upon the hub 262 of the outer rotor section. In this case a forward rotary movement of the outer rotor section during rebound action of the spring system of the car causes the two rotor sections to be spread apart or be moved lengthwise of the axis of rotation by the cooperation of the inclines 33, 34 on the opposing parts of their hubs for producing a frictional engagement of the disks of these rotor sections with the friction disks on the walls of the housing, and when the return or backward rotation of these rotor sections is effected by the resilience of the spring 51 acting directly upon the inner rotor section and transmitting this backward motion to the outer rotor section by engagement of the shoulders 34 on the inner rotor section with the shoulders 33 on the outer rotor section. The work of returning the rotor sections is therefore effected in the construction, shown in Figs. 9 and 10 by the use of one spring which is not so rapid and therefore not quite as desirable as the construction shown in Figs. 1 and 3 in which separate springs are employed for returning the rotor sections individually.

Moreover, the construction shown in Figs. 1 and 3 employing two springs, permits of adjusting this absorber for adapting its capacity to different loads, this being best effected by utilizing an outer spring 43 of the required resilience best suited for a particular installation, but employing a spring 44 of various resilience for wedging action and for returning the inner rotor sections.

In both constructions the angularity of the cooperating inclines between the two rotor sections must be so determined that the lateral pressure exerted by the rotor sections against the housing will not be so great as to set up a resistance which would overcome the capacity of the spring system, otherwise the cooperating friction surfaces will become bound and the device cease to operate.

By making the periphery of the drum of irregular shape which would vary the radius in different parts thereof, a variable resistance or torque action is obtained, while rotating the drum by the pull of the cable which compensates for the increasing and decreasing load imposed upon the absorber and varies the shock absorbing capacity accordingly.

I claim as my invention:—

1. A shock absorber comprising a sectional rotor and a stator adapted to be connected with relatively movable members, pressure creating means for moving the sections of said rotor in different directions toward said stator for frictionally engaging the same, and a spring wound about one of the sections of said rotor and a flexible member about the other section of said rotor.

2. A shock absorber comprising a rotor and stator adapted to be connected with relatively movable members, said rotor having independently movable sections, pressure creating means for moving said sections toward said stator while the rotor is turning in one direction, and spring means attached to each section of said rotor for turning the rotor in the opposite direction.

3. A shock absorber comprising a rotor and a stator adapted to be connected to relatively movable members, said stator forming a housing for said rotor and said rotor having a drum, a line connected with said drum and adapted to be wound upon said drum and unwound therefrom for turning the drum forwardly, spring means for turning the rotor backwardly, and rotatable wedge means for pressing said rotor laterally toward said stator, said rotor being eccentrically mounted and so arranged that said line will operate on the longer portion of the eccentric during the initial tensioning of said spring means.

4. A shock absorber comprising a rotor and a stator adapted to be connected with relatively movable members, said stator having an arbor and walls at opposite ends of said arbor, said rotor consisting of two sections which turn on said arbor and have disks facing said walls and cooperating inclines on their opposing parts, a drum arranged on one of said rotor sections, a line connected with said drum for turning the rotor sections forwardly and spring means for turning said rotor backwardly.

5. A shock absorber comprising a rotor and a stator adapted to be connected with relatively movable members, said stator having an arbor and walls at opposite ends of said arbor, said rotor consisting of two sections which turn on said arbor and have disks facing said walls and cooperating inclines on their opposing parts, which are adapted to engage and press said disk against said walls upon turning said rotor forward and cooperating shoulders on the opposing parts of the rotor sections for permitting the same to be turned backwardly without pressing their disks against said walls, means for turning the rotor forwardly, and means for turning the rotor backwardly.

6. A shock absorber comprising a rotor and a stator adapted to be connected with relatively movable members, said stator having an arbor and walls at opposite ends of said arbor, said rotor consisting of two sections which turn on said arbor and have disks facing said walls and cooperating inclines on their opposing parts, separate springs for turning said rotor sections backwardly, and means for turning said rotor sections forwardly.

7. A shock absorber comprising a rotor and a stator adapted to be connected with relatively movable members, said stator having the form of a housing, said rotor consisting of two sections pivoted on the housing and provided with friction disks and with cooperating inclines for pressing said disk against the housing upon turning the rotor forwardly and also with cooperating shoulders for turning the rotor backwardly without pressing the disks against the housing, spring means for turning said rotor backwardly consisting of a light spring connecting one of said rotor sections with the housing, a heavy spring connecting the other rotor section with the housing, and means connected with the last-mentioned rotor section for turning the same backwardly.

8. A shock absorber comprising a rotor and a stator adapted to be connected with relatively movable members, said stator being constructed in the form of a housing having two opposing sections, each of which has a side wall, a peripheral rim and a central hub, an inner bearing sleeve arranged between said hubs, a connecting bolt passing through said sleeve and hubs, an outer bearing sleeve, bearing rollers arranged between said inner and outer bearing sleeves, said rotor consisting of two sections consisting of hubs mounted on said outer bearing sleeve and provided at their outer ends with friction disks adapted to engage said walls and their inner opposing ends being provided with cooperating inclines adapted to press said disks against said walls during forward turning of said rotor sections and also provided with cooperating shoulders for turning said rotor sections backwardly in unison with reduced pressure on the disks thereof against said walls, spring means for turning said rotor sections backwardly, and means for turning said rotor scetions forwardly.

9. A shock absorber comprising a rotor and a stator adapted to be connected with relatively movable members, said stator being constructed in the form of a housing having two opposing sections each of which has a side wall, a peripheral rim and a central hub, an inner bearing sleeve arranged between said hubs, a connecting bolt passing through said sleeve and hubs, an outer bearing sleeve, bearing rollers arranged between said inner and outer bearing sleeves, said rotor consisting of two sections consisting of hubs, mounted on said outer bearing sleeve and provided at their outer ends with friction disks adapted to engage said walls and their inner opposing ends being provided with cooperating inclines adapted to press said disks against said walls during forward turning of said rotor sections and also provided with cooperating shoulders for turning said rotor sections backwardly in unison with a reduced pressure on the disks thereof against said walls, spring means for turning said rotor sections backwardly, means for turning said rotor sections forwardly, the outer sides of said rotor sections being provided with non-circular sockets one of which receives one non-circular part of the bolt, and a bracket having a non-circular collar fitting the correspondingly shaped socket on the hub of the other housing and a lug for engaging a stationary support and adapted to be clamped against the latter by said bolt.

10. A shock absorber comprising a rotor and stator adapted to be connected with relatively movable members, pressure creating means comprising a plurality of rotatable cam members for moving said rotor laterally toward said stator, one of said cam members being adapted to rotate the other solely by the engagement of the cam surfaces of said members, a drum arranged on said rotor, a line adapted to be wound on said drum and unwound therefrom, said drum having its periphery of eccentric or cam shaped form and arranged to present its shortest radius to the line of pull in the maximum separation of said members and its longest radius in the normal separation of said members.

In testimony whereof I, hereby affix my signature.

JOSEPH M. HALL.